US012807421B2

(12) United States Patent
Hirsch De Hesselle et al.

(10) Patent No.: US 12,807,421 B2
(45) Date of Patent: Nov. 24, 2026

(54) METHOD FOR DETERMINING AN OCCUPANCY SITUATION OF CONTAINERS IN AN INSTALLATION, AND A DEVICE FOR THIS PURPOSE

(71) Applicant: Krones AG, Neutraubling (DE)

(72) Inventors: Christian Hirsch De Hesselle, Zeitlarn (DE); Christian Appel, Ergolding (DE); Thomas Albrecht, Beilngries (DE); Ahmad Alsheikh, Neutraubling (DE); Benedikt Boettcher, Bruckmühl (DE); Andreas Ketterl, Wiesent (DE); Lukas Schindler, Duggendorf (DE)

(73) Assignee: KRONES AG, Neutraubling (DE)

( * ) Notice: Subject to any disclaimer, the term of this patent is extended or adjusted under 35 U.S.C. 154(b) by 551 days.

(21) Appl. No.: 18/348,963

(22) Filed: Jul. 7, 2023

(65) Prior Publication Data

US 2024/0017934 A1 Jan. 18, 2024

(30) Foreign Application Priority Data

Jul. 12, 2022 (DE) ......................... 102022117311.9

(51) Int. Cl.

*B65G 43/08* (2006.01)
*G06T 7/20* (2017.01)
*G06T 7/70* (2017.01)

(52) U.S. Cl.

CPC ................ *B65G 43/08* (2013.01); *G06T 7/20* (2013.01); *G06T 7/70* (2017.01);

(Continued)

(58) Field of Classification Search

CPC .............. B65G 43/08; B65G 2203/041; B65G 2201/0235; B65G 2203/044; B65G 15/30;

(Continued)

(56) References Cited

U.S. PATENT DOCUMENTS

| | | | | |
|---|---|---|---|---|
| 10,699,421 | B1 * | 6/2020 | Cherevatsky | G06F 18/2113 |
| 2016/0052764 | A1 * | 2/2016 | Führer | B67C 3/007 348/143 |

(Continued)

FOREIGN PATENT DOCUMENTS

| | | | |
|---|---|---|---|
| CN | 103106404 | A | 5/2013 |
| CN | 111193862 | A | 5/2020 |

(Continued)

OTHER PUBLICATIONS

European Patent Office, Extended European Search Report Issued in Application No. 23167657.8, Dec. 13, 2023, Germany, 16 pages.

(Continued)

*Primary Examiner* — Timothy R Waggoner

(74) *Attorney, Agent, or Firm* — McCoy Russell LLP

(57) ABSTRACT

The disclosure relates to a method for determining an occupancy situation of containers in an installation, the method comprising: using at least one camera for capturing the occupancy situation of the containers in the installation and obtaining a captured occupancy situation, analyzing the captured occupancy situation and obtaining an analyzed occupancy situation, and controlling the installation based on the analyzed occupancy situation. Furthermore, the disclosure comprises a device comprising at least one camera and a control device with instructions that are stored thereon and that, when executed by a processor, cause the control device to execute the method.

12 Claims, 3 Drawing Sheets

(52) U.S. Cl.
CPC ................ *B65G 2201/0235* (2013.01); *B65G 2203/044* (2013.01); *G06T 2207/30241* (2013.01)

(58) Field of Classification Search
CPC ... G06T 2207/30241; G06T 7/20; G06T 7/70; G05B 19/4183; B67C 3/24; B67C 3/22; G06V 10/12; G06V 20/40
See application file for complete search history.

(56) References Cited

U.S. PATENT DOCUMENTS

| | | | | |
|---|---|---|---|---|
| 2016/0132764 | A1 * | 5/2016 | Paul | B65G 43/08 198/804 |
| 2020/0151907 | A1 * | 5/2020 | Sugita | G06T 7/80 |
| 2022/0106129 | A1 * | 4/2022 | Douglas | B65G 47/28 |

FOREIGN PATENT DOCUMENTS

| | | | |
|---|---|---|---|
| CN | 113763433 | A | 12/2021 |
| DE | 102012022005 | A1 | 5/2013 |
| DE | 102013207139 | A1 | 10/2014 |
| DE | 102013209362 | A1 | 11/2014 |
| DE | 102019217430 | A1 | 5/2020 |
| WO | 2014170079 | A1 | 10/2014 |

OTHER PUBLICATIONS

State Intellectual Property Office of the People's Republic of China, Office Action and Search Report Issued in Application No. 202310789984.5, Aug. 1, 2025, 15 pages. (Submitted with Partial Translation).

* cited by examiner

METHOD FOR DETERMINING AN OCCUPANCY SITUATION OF CONTAINERS IN AN INSTALLATION, AND A DEVICE FOR THIS PURPOSE

CROSS REFERENCE TO RELATED APPLICATION

The present application claims priority to German Patent Application No. 102022117311.9 filed on Jul. 12, 2022. The entire contents of the above-listed application is hereby incorporated by reference for all purposes.

TECHNICAL FIELD

The disclosure relates to a method for determining an occupancy situation of containers in an installation and to a device.

BACKGROUND

One or more jam switches can be provided along a conveying path of containers, usually delimited by guardrails, in a storage area, for example a beverage filling installation. A corresponding jam switch is triggered when the containers are pressed against this jam switch as a result of the containers jamming on a conveyor or the like, and the stagnation pressure exceeds a particular magnitude.

As soon as a jam switch is triggered, the conveyor is full of containers and the machine or the entire line may stand still. There is only one possible reaction to the full state. A jam switch currently cannot provide feedback on a filling behavior of a conveyor. Predicting when a jam switch will be triggered is also not possible. Moreover, a jam switch cannot provide any information as to when which container is or will be at what position.

WO 2014/170079 A1 discloses a method for monitoring and controlling a filling installation and a device for carrying out the method. In order to analyze a dynamic state of a filling installation, image sequences are recorded in at least one region of the filling installation and are evaluated by calculating an optical flow from an image sequence with a predetermined number of individual images. The optical flow is evaluated and control signals for the filling installation are output when the evaluation of the optical flow portends or indicates a deviation from a normal operating state.

SUMMARY

Object

The object of the disclosure is to provide a method and a device which can efficiently determine an occupancy situation of an installation and can use it to control the installation.

Achievement

The object is achieved by the method described herein and the device described herein.

The method for determining an occupancy situation of containers in an installation comprises using at least one camera for capturing the occupancy situation of the containers in the installation and obtaining a captured occupancy situation, analyzing the captured occupancy situation and obtaining an analyzed occupancy situation, and controlling the installation based on the analyzed occupancy situation.

In the installation, the containers can be transported in a transport direction by means of a conveyor, which may comprise, for example, one or more conveyor belts. The containers may be or comprise bottles, can, bundles or pallets loaded therewith.

The occupancy situation can be captured in a recording range of the at least one camera. In the case of multiple cameras, the individual recording ranges can partially overlap.

The captured occupancy situation may, for example, represent an arrangement of one or more containers. The captured occupancy situation can be analyzed using one or more evaluation algorithms. Controlling the installation based on the analyzed occupancy situation, a transport speed of the containers and/or a feed rate and/or discharge rate of the containers may, for example, be controlled.

Overall, the method can use multiple coordinated algorithms that can receive image information of the captured occupancy situation from the at least one camera and can further process it on a computer system that is close to the installation or integrated (a computer located in a computer room or in a cloud).

The method can further comprise determining positions of the containers on the basis of the captured occupancy situation.

Using the at least one camera for capturing the occupancy situation may comprise recording a video of the occupancy situation of the containers in the installation or may comprise a real-time transmission of the occupancy situation of the containers in the installation (live stream).

Obtaining the captured occupancy situation, analyzing the captured occupancy situation and/or obtaining the analyzed occupancy situation can take place in the installation and/or by means of a remote device.

The video or real-time transmission can be in 2D. The video or real-time transmission can be recorded at various frame rates. Information on the frame rate can be provided for analyzing the captured occupancy situation or it can be accessed.

Individual images of the video or of the real-time transmission can be analyzed by means of an image recognition algorithm, and existing containers in the individual images can be recognized at least on the basis of partial regions. The image recognition algorithm may have been trained in advance using recorded videos. For example, the image recognition algorithm can be or can comprise a neural network.

The recognition of existing containers at least on the basis of partial regions in the individual images can comprise a recognition of an upper side or a lower side or an opening of a container or a cover or another closure of a container. The partial regions can comprise the upper side, the lower side, the opening, the cover or another closure or other parts of the container. It is thus not necessary for a container to be recognized in its entirety in the individual images in each case. A recognition of existing containers on the basis of partial regions can be advantageous if the containers are transported, for example, in a pile.

Each of the recognized containers can be assigned a unique identification. The unique identification may be or comprise a number. A container can keep the assigned unique identification over an entire region in which an occupancy situation can take place using the at least one camera.

The unique identification can be defined by means of a Kalman filter. The container can keep this unique identification as long as the container is located in a region to be monitored (by the at least one camera). The region to be monitored can consist of one or more combined recording ranges of one or more of the cameras. If the container is briefly covered within the region to be monitored (for example, for less than 5 seconds), for example by fixtures such as struts, the Kalman filter can be applied to assign the unique identification to the container that is located with the highest probability at the expected location in the visible region.

The application of the Kalman filter can be applied if the region covering the container is smaller than a diameter of the container and/or if the movement direction and the speed do not change too much due to external influences. It is also possible to increase the frame rate and/or to use a neural network for a unique identification.

The method can further comprise calculating an area center point of each recognized container for determining a position of the container, and converting the area center point from a coordinate system of the at least one camera into a global coordinate system. Errors caused by optical distortions can be avoided by the conversion.

The method can further comprise automatically determining conversion parameters for the conversion based on a checkerboard pattern to which the at least one camera has been calibrated. The checkerboard pattern can be calibrated. The checkerboard pattern can be permanently attached to an upper side of the installation or the checkerboard pattern can be arranged at a height of the containers to be recorded.

For example, in the case of two cameras whose recording ranges partially overlap, such a checkerboard pattern can be arranged in the overlap region and the two cameras can each be calibrated thereto. The containers can thus be tracked across the recording ranges of the two cameras. Correspondingly, more than two cameras can also be provided, in each overlap region of which a checkerboard pattern for calibrating the respective cameras can be provided. Instead of the checkerboard pattern, distinct points in the overlap region can also be present, wherein the distinct points can comprise known distances of guardrail holders, machine dimensions and/or width of a conveyor. The real distance of these points can be known.

The unique identification of the containers can be maintained in the different recording ranges.

Alternatively, the parameters can be determined on the basis of distinct points in the recording range of the at least one camera, wherein the distinct points can comprise known distances of guardrail holders, machine dimensions and/or width of a conveyor. The real distance of these points can be known. It is also conceivable to use the known diameter of the containers.

Alternatively, the aforementioned distinct points can be defined in a 3D CAD model, and calibration of the at least one camera can be carried out within the 3D CAD model. In a next step, a mask can be exported from the 3D CAD model and the determined measurement parameters for the real camera can be adopted. The exported mask can in this case be placed over the camera image, and the distinct points from the 3D CAD model can be superimposed with the real distinct points. Measuring the distinct points on the real machine is thus no longer necessary.

For example, in the case of two cameras whose recording ranges have an overlap region, calibration by means of the three aforementioned calibration variants is possible. The recordings can also take place in succession, wherein the position of the checkerboard pattern is maintained and the checkerboard pattern can be recorded by both cameras.

Alternatively, for the conversion, a lens equation of the at least one camera and a plane that is located in the three-dimensional space and runs through all container upper sides can be used. The container upper sides can comprise, for example, a closure of a container or a can lid. This can lead to a nonlinear equation system for determining the positions in the 3D space. By means of this conversion, it can be avoided that a diameter of the container upper sides in the image, the determination of which diameter can contain errors as a result of reflection effects and/or a lower resolution and/or contrasts, contributes directly to the position calculation. A more accurate determination of the positions of the containers can thus be possible.

In the context of a superimposed optimization, unknown parameters of the plane in three-dimensional space and/or also unknown constants of the camera can be adapted so long and the real unknown values can thus be approximated until differences between the diameter, calculated from the image, of the container upper side and the actual known diameter can be minimal.

The method can further comprise calculating a speed of the containers from the position of the container and a frame rate of the at least one camera. The positions of the container in multiple successive individual images can be used for this purpose.

The method can further comprise a pre-calculation of a future position of the containers. The future position can be a position in a temporal future.

As a result of this pre-calculation and an associated pre-processing of the information of the individual images in the installation and/or in machines or in the vicinity of machines that are comprised by the installation, the data volume which, for example, must be transferred to a superordinate line control or installation control can be kept comparatively small. This comparatively small data volume can also enable direct transmission of the data into a cloud or a central computer room and thus a location-independent application. It may also be provided that entire videos or video streams are transmitted into the cloud and then processed further there.

Not only the function of one or more jam switches can be mapped by means of the method, but the current occupancy rate of the installation, of a machine of the installation, of a machine feed and/or of a conveyor can also be determined at the same time. Devices in a beverage filling installation and/or packaging installation which transports containers and which is visible to the at least one camera for capturing the occupancy situation of the containers can be monitored, analyzed and controlled by means of the method.

The method can further comprise representing the analyzed occupancy situation on a display, wherein, for example, the representation can comprise a representation of a current status of at least one of the containers.

One or more evaluation regions for analyzing the captured occupancy situation can be defined or definable.

The evaluation region(s) can be defined, for example, before the installation is put into operation. The definition can be made by an operator, for example on a touch display or a separate computer unit with graphical output, wherein the display or unit can pass on the definition accordingly.

The evaluation region(s) can be in one or more recording ranges of a corresponding number of cameras. The evaluation region(s) can be as large as or smaller than the one or more recording ranges.

An automatic prediction can take place as to the time point at which one or more evaluation regions of the one or more evaluation regions can operate at full or zero capacity, wherein, for example, an optical signal can be output if a maximum occupancy is exceeded or an occupancy falls below a minimum occupancy.

By means of the automatic prediction, an adapted control of the installation can take place so that operation at full or zero capacity cannot occur.

The method can further comprise a conclusion about a container load based on the speed of the containers and a theoretical transport speed, wherein, for example, an optical signal can be output if a predetermined maximum value is exceeded, and/or wherein, for example, a control signal can be output for controlling the transport speed and/or transport direction, if the predetermined maximum value is exceeded.

Consideration of the container load can be sensible in the case of sensitive containers, for example in the case of containers that comprise lightweight glass, PET or aluminum.

With the aid of the unique identification of each container, each container can be tracked over the entire region to be monitored. When using one or more cameras, this may be along an entire line. This tracking also extends over regions that are not visible to the cameras. In these non-visible or poorly visible regions, serial processing of containers can take place (filling, labeling, etc.). By reading machine parameters, such as power, of these serial processing stations, tracking can also be possible in these regions. As soon as the container thus travels into a region not monitored by a camera (hereinafter referred to as "black box"), its unique identification can be stored. The machine parameters within the black box can be used to calculate when the container leaves the machine. When leaving the machine, the container can again obtain the unique identification stored in the previous step. Continuous tracking can thus be ensured.

The at least one camera can be left at a location above the installation, or wherein the at least one camera can be moved above the installation.

The at least one camera can be designed to be stationary so that it can be left at the location above the installation while the containers are being recorded.

The at least one camera can be designed to be movable above the installation, for example along a system of rods or, for example, by being designed as a flying camera drone or Spidercam, so that it can occupy different locations while the containers are being recorded. For recognizing and tracking each container, the movement of the at least one camera (for example, translation and rotation) can also be recorded during operation. Thus, a new calibration does not have to take place for each camera position. Alternatively, continuous calibration of the camera can be provided, wherein the camera is newly calibrated for each changing position. The methods described above can be used for the calibration.

"Above" here can mean that the at least one camera is arranged at a height where the containers can be recorded from above as soon as they are transported into the respective recording range of the at least one camera. "Above" can also mean that the at least one camera is arranged at a greater height than the installation and/or the conveyor and/or the conveyor belts thereof are arranged in the respective recording range of the at least one camera. In the viewing direction from top to bottom (along a vertical), the at least one camera can be arranged in the region or next to the region of the installation and/or the conveyor and/or the conveyor belts thereof.

By arranging the at least one camera above the installation, the camera can be rotated by one or more angles in order to be able to be focused on the regions to be analyzed. The at least one camera may comprise a rotating device that enables rotation by one or more angles.

A device comprising at least one camera and a control device with instructions that are stored thereon and that, when executed by a processor, cause the control device to execute the method, as described above or below.

BRIEF DESCRIPTION OF FIGURES

The accompanying Figures show, by way of example, aspects and/or exemplary embodiments of the disclosure for better understanding and illustration. In the figures.

DETAILED DESCRIPTION OF FIGURES

Figure 1:
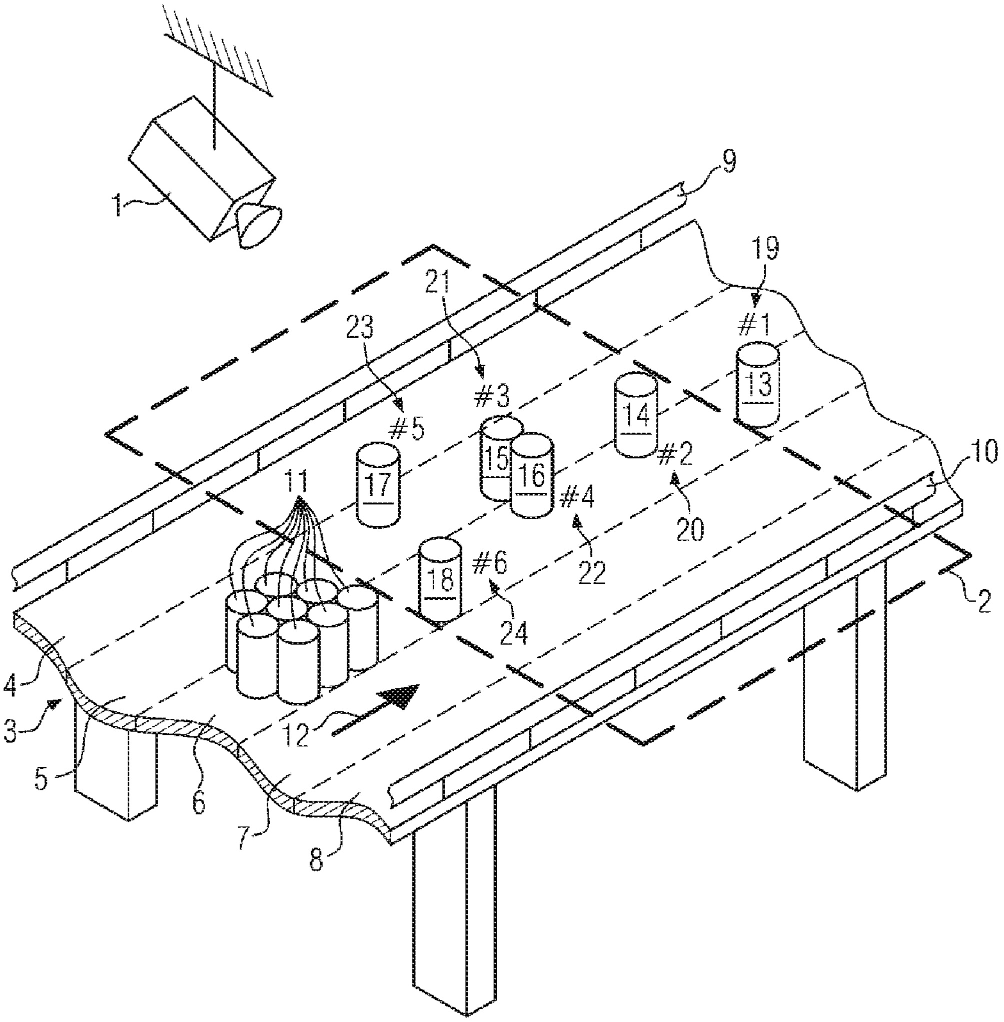
FIG. 1 shows an oblique plan view of a part of an installation with a camera and a recording range.

FIG. 1 shows an oblique plan view of a part of an installation with a camera 1 and a recording range 2 of the camera 1. A conveyor 3 comprises, by way of example, five conveyor belts 4, 5, 6, 7, 8, which are delimited laterally by guardrails 9, 10. In a transport direction 12, containers 11, 13, 14, 15, 16, 17, 18 can be transported on the conveyor belts 4-8.

The camera 1 is arranged above the installation or above the conveyor 3. "Above" here means that the camera 1 is arranged at a height, where the containers 11, 13, 14, 15, 16, 17, 18 can be recorded from above as soon as they are transported into the recording range 2. The recording can be in 2D. "Above" can also mean that the camera 1 is arranged at a greater height than the installation and/or the conveyor 3 and/or the conveyor belts 4-8 thereof are arranged in the recording range 2. In the viewing direction from top to bottom (along a vertical), the camera 1 can be arranged in the region or next to the region of the installation and/or the conveyor 3 and/or the conveyor belts 4-8 thereof.

In the representation, the recording range 2 is wider than the conveyor 3 and extends along a partial length of the conveyor 3. In the viewing direction from top to bottom (along a vertical), the camera 1 is arranged next to the region of the conveyor 3 and the conveyor belts 4-8 thereof.

Containers 13-18 that pass into the recording range 2 of the camera 1 are recorded by the camera 1. Individual images of the recording can then be analyzed by means of an image recognition algorithm, whereby containers 13-18 present in the individual images can be recognized. The recognized containers 13-18 are each assigned a unique identification 19, 20, 21, 22, 23, 24, for example #1, #2, #3, #4, #5, #6.

Figure 2:
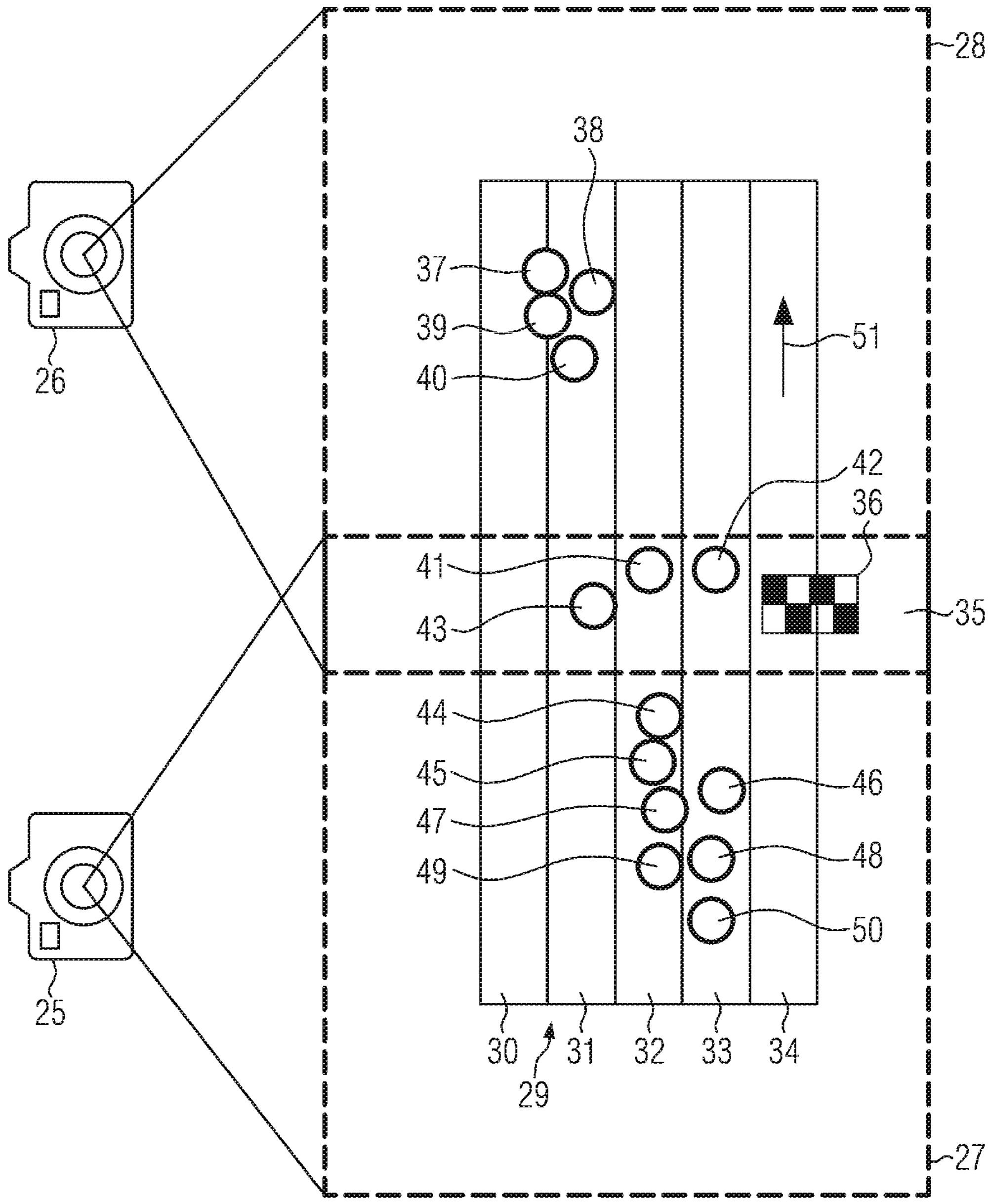
FIG. 2 shows a plan view of an installation with two cameras, the respective recording ranges of which have an overlap region.

FIG. 2 shows a plan view of an installation with two cameras 25, 26 whose respective recording ranges 27, 28 have an overlap region 35. A partial region of a conveyor 29 is shown, which, by way of example, comprises five conveyor belts 30, 31, 32, 33, 34 on which containers 37, 38, 39, 40, 41, 42, 43, 44, 45, 46, 47, 48, 49, 50 are transported in a transport direction 51.

The first camera 25 and the second camera 26 are arranged above the installation. "Above" here means that the cameras 25, 26 are each arranged at a height where the containers 37-50 can be recorded from above as soon as they pass into the first recording range 27 of the first camera 25 or into the second recording range 28 of the second camera 26. The designations "first" and "second" are only used for distinction and otherwise do not have any limiting significance.

"Above" can mean that the cameras 25, 26 are each arranged at a greater height than the installation and/or the conveyor 29 and/or the conveyor belts 30-34 thereof are arranged in the respective recording ranges 27, 28. In the viewing direction from top to bottom (along a vertical), the cameras 25, 26 can be arranged in the region or next to the region of the installation and/or the conveyor 29 and/or the conveyor belts 30-34 thereof.

In the representation, in a view from top to bottom (along a vertical), the cameras 25, 26 are each arranged next to a region of the conveyor 29 and the conveyor belts 30-34 thereof.

The cameras 25, 26 can be designed to be stationary so that they are left at one location while the containers 37-50 are being recorded, or the cameras 25, 26 can be designed to be movable above the installation, for example along a system of rods or, for example, by being designed as a flying camera drone, so that they can occupy different locations while the containers 37-50 are being recorded. It is also possible for one of the cameras 25, 26 to be movable and for the other of the two cameras 25, 26 to be stationary.

In the representation, the first recording range 27 is wider than the conveyor 29 and extends along a first partial length of the represented partial region of the conveyor 29. The second recording range 28 has the overlap region 35 with the first recording range 27 and, when viewed in the transport direction, also extends subsequently to the first recording range 27. In the representation, the second recording range 28 is wider than the conveyor 29 and extends along a second partial length of the represented partial region of the conveyor 29. In the overlap region 35, a checkerboard pattern 36 is arranged, which can be used for calibrating the two cameras 25, 26. The checkerboard pattern 36 can be calibrated.

The containers 37-50 that pass into the first recording range 27 are recorded by the first camera 25. The recording can take place in 2D. Individual images of the recording can then be analyzed by means of an image recognition algorithm, whereby containers 37-50 present in the individual images can be recognized. The recognized containers 37-50 can each be assigned a unique identification, which they maintain even during further transport into the second recording range 28 (which also comprises the overlap region 35). A unique identification of the containers 37-50 across the two recording ranges 27, 28 is thus possible.

The respective area center points can be calculated for the individual containers 37-50. The area center point can be used to determine a position of the container. The area center point can then be converted from the respective coordinate system of the camera into a global coordinate system in order to avoid errors caused by optical distortions. The parameters required for the conversion are automatically determined by means of the checkerboard pattern 36 to which the two cameras 25, 26 have been calibrated. A transmission of the unique identification of the containers 37-50 and the calculated area center points from the first camera system and the second camera system is thus possible.

The speed of the associated container can be determined from the area center point and a frame rate of the recording on the basis of the individual images. This information can be used to pre-calculate where the container will be located in the installation or on the conveyor 29 in the temporal future.

Figure 3:
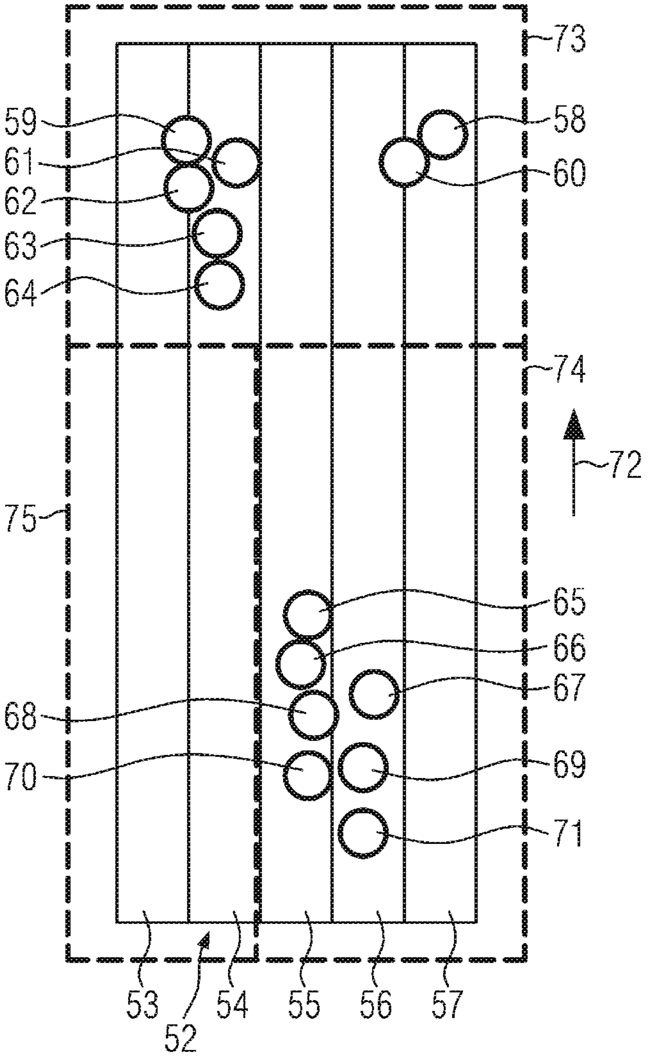
FIG. 3 shows an arrangement of three evaluation regions.

FIG. 3 shows an arrangement of three evaluation regions 73, 74, 75. The evaluation regions 73, 74, 75 can be defined, for example before the installation is put into operation, or can be definable, for example by definition by an operator, for example on a touch display, wherein the touch display can pass on this information accordingly.

The evaluation regions 73, 74, 75 can be in one or more recording ranges (not shown) of a corresponding number of cameras (not shown). The evaluation regions 73, 74, 75 can be as large as or smaller than the one or more recording ranges.

A partial region of a conveyor 52 is shown, which, by way of example, comprises five conveyor belts 53, 54, 55, 56, 57 on which containers 58, 59, 60, 61, 62, 63, 64, 65, 66, 67, 68, 69, 70, 71 are transported in a transport direction 72. Each of the containers 58-71 has already been assigned a unique identification by a recording range.

For the individual containers 58-64, the respective area center point can now be calculated in the first evaluation region 73 and can be used to determine a position of the container 58-64. The calculated area center points can then be converted from the respective coordinate system of the camera, in the recording range of which the first evaluation region 73 is, into a global coordinate system.

For the individual containers 65-71, the respective area center point can now be calculated in the second evaluation region 74 and can be used to determine a position of the container 65-71. The calculated area center points can then be converted from the respective coordinate system of the camera, in the recording range of which the second evaluation region 74 is, into a global coordinate system.

There are no containers in the third evaluation region 75.

The designations "first," "second" and "third" are only used for distinction and otherwise do not have any limiting significance.

From the area center points and a frame rate with which a camera has recorded the recording, the speeds of the associated containers can be determined on the basis of the individual images.

The invention claimed is:

1. A method for determining an occupancy situation of containers in an installation, the method comprising:

using at least one camera for capturing the occupancy situation of the containers in the installation and obtaining a captured occupancy situation, analyzing the captured occupancy situation and obtaining an analyzed occupancy situation, and controlling the installation based on the analyzed occupancy situation, wherein the use of the at least one camera for capturing the occupancy situation comprises recording of a video of the occupancy situation of the containers in the installation or real-time transmission of the occupancy situation of the containers in the installation, wherein individual images of the video or of the real-time transmission are analyzed by means of an image recognition algorithm and containers present in the individual images are recognized at least on the basis of partial regions, wherein each of the recognized containers is assigned a unique identification, with the aid of the unique identification of each container, tracking each container over the entire region to be monitored, extending tracking over regions that are not visible to the cameras by reading machine parameters of a machine, storing the unique identification of a container as soon as the container travels into a region, called black box, not monitored by a camera, using the machine parameters within the black box to calculate when the container leaves the machine, when leaving the machine, the container again obtains the unique identification stored before, further comprising calculating an area center point of each recognized container for determining a position of the container, and converting the area center point from a coordinate system of the at least one camera into a global coordinate system, further comprising calculating a speed of the containers from the position of the container and a frame rate of the at least one camera, further comprising a conclusion about a container load based on the speed of the containers and a theoretical transport speed, wherein a control signal can be output for controlling the transport speed and/or transport direction, if the predetermined maximum value is exceeded.

2. The method according to claim 1, further comprising: determining positions of the containers on the basis of the captured occupancy situation.

3. The method according to claim 1, wherein the unique identification is determined by means of a Kalman filter.

4. The method according to claim 1, further comprising automatically determining conversion parameters for the conversion based on a checkerboard pattern to which the at least one camera has been calibrated.

5. The method according to claim 1, wherein a lens equation of the at least one camera and a plane that is located in the three-dimensional space and runs through all container upper sides are used for the conversion.

6. The method according to claim 1, further comprising pre-calculating a future position of the containers.

7. The method according to claim 1, further comprising representing the analyzed occupancy situation on a display, wherein, for example, the representation comprises a representation of a current status of at least one of the containers.

8. The method according to claim 1, wherein one or more evaluation regions for analyzing the captured occupancy situation are defined or can be defined.

9. The method according to claim 8, wherein an automatic prediction takes place as to the time point at which one or more evaluation regions of the one or more evaluation regions operates at full or zero capacity, wherein, for example, an optical signal can be output if a maximum occupancy is exceeded or an occupancy falls below a minimum occupancy.

10. The method according to claim 1, wherein an optical signal can be output if a predetermined maximum value is exceeded.

11. The method according to claim 1, wherein the at least one camera is left at a location above the installation, or wherein the at least one camera is moved above the installation.

12. A device comprising at least one camera and a control device with instructions that are stored thereon and that, when executed by a processor, cause the control device to execute the method according to claim 1.

* * * * *